US012612497B2

(12) United States Patent
Galitz et al.

(10) Patent No.: US 12,612,497 B2
(45) Date of Patent: Apr. 28, 2026

(54) CHEMICAL TREATMENT OF COMPONENTS

(71) Applicant: EOS GmbH Electro Optical Systems, Krailling (DE)

(72) Inventors: Verena Galitz, Krailling (DE); Karl Freihart, Germering (DE); Matthias Frosch, Bergtheim (DE)

(73) Assignee: EOS GmbH Electro Optical Systems, Krailling (DE)

( * ) Notice: Subject to any disclaimer, the term of this patent is extended or adjusted under 35 U.S.C. 154(b) by 87 days.

(21) Appl. No.: 18/293,756

(22) PCT Filed: Jul. 26, 2022

(86) PCT No.: PCT/EP2022/070856
§ 371 (c)(1),
(2) Date: Jan. 30, 2024

(87) PCT Pub. No.: WO2023/011966
PCT Pub. Date: Feb. 9, 2023

(65) Prior Publication Data
US 2024/0336753 A1      Oct. 10, 2024

(30) Foreign Application Priority Data

Aug. 2, 2021     (DE) .......................... 102021119991.3

(51) Int. Cl.
*C08J 7/02* (2006.01)
*B29C 64/35* (2017.01)
(Continued)

(52) U.S. Cl.
CPC ................. *C08J 7/02* (2013.01); *B29C 64/35* (2017.08); *B29C 71/0009* (2013.01); *C08J 7/14* (2013.01); *B33Y 40/20* (2020.01)

(58) Field of Classification Search
CPC ......... B29C 71/0009; B29C 64/35; C08J 7/02
See application file for complete search history.

(56) References Cited

U.S. PATENT DOCUMENTS 9,908,291 B2      3/2018  Mech
10,759,116 B2      9/2020  Wynne et al.
(Continued)

FOREIGN PATENT DOCUMENTS

DE          4410046  C1      5/1995
DE      112014002879  T5      4/2016
(Continued)

*Primary Examiner* — Timothy Kennedy
(74) *Attorney, Agent, or Firm* — Polsinelli PC

(57)          ABSTRACT

Disclosed is a method for treating objects produced by an additive manufacturing process which have at least one surface formed from a polymer with a glass transition temperature of at least 120° C., and preferably are formed from such a polymer, and in which the surface of the object is brought into contact with an organic or inorganic solvent. By such a treatment, the surface of the objects can be smoothed and relevant mechanical properties can be improved. Further disclosed are three-dimensional objects produced according to such a method and to the use of organic or inorganic solvents to reduce the surface roughness and/or to improve the mechanical properties and/or the chemical resistance.

13 Claims, 1 Drawing Sheet

(51) Int. Cl.
  *B29C 71/00* (2006.01)
  *C08J 7/14* (2006.01)
  *B33Y 40/20* (2020.01)

(56) References Cited

U.S. PATENT DOCUMENTS

| | | | | |
|---|---|---|---|---|
| 2008/0169585 A1* | 7/2008 | Zinniel | ............... | B29C 71/0009 |
| | | | | 264/293 |
| 2009/0321972 A1* | 12/2009 | Zinniel | .................. | B33Y 40/20 |
| | | | | 425/445 |
| 2011/0245457 A1* | 10/2011 | Rougelot | ................. | C08J 11/06 |
| | | | | 210/184 |
| 2012/0195994 A1* | 8/2012 | El-Siblani | ............. | B29C 64/357 |
| | | | | 15/320 |
| 2019/0054666 A1* | 2/2019 | Shpiro | ................ | B29C 71/0009 |
| 2020/0324470 A1* | 10/2020 | Walker | .................. | B33Y 80/00 |
| 2021/0008819 A1* | 1/2021 | Pfefferkorn | ......... | B29C 71/0009 |
| 2021/0114304 A1 | 4/2021 | Abstreiter et al. | | |
| 2021/0197502 A1 | 7/2021 | Kramer et al. | | |
| 2022/0266518 A1* | 8/2022 | Peter | .................... | B29C 64/124 |

FOREIGN PATENT DOCUMENTS

| | | | |
|---|---|---|---|
| FR | 3022250 A1 | 12/2015 |
| WO | 2020099236 A1 | 5/2020 |

* cited by examiner

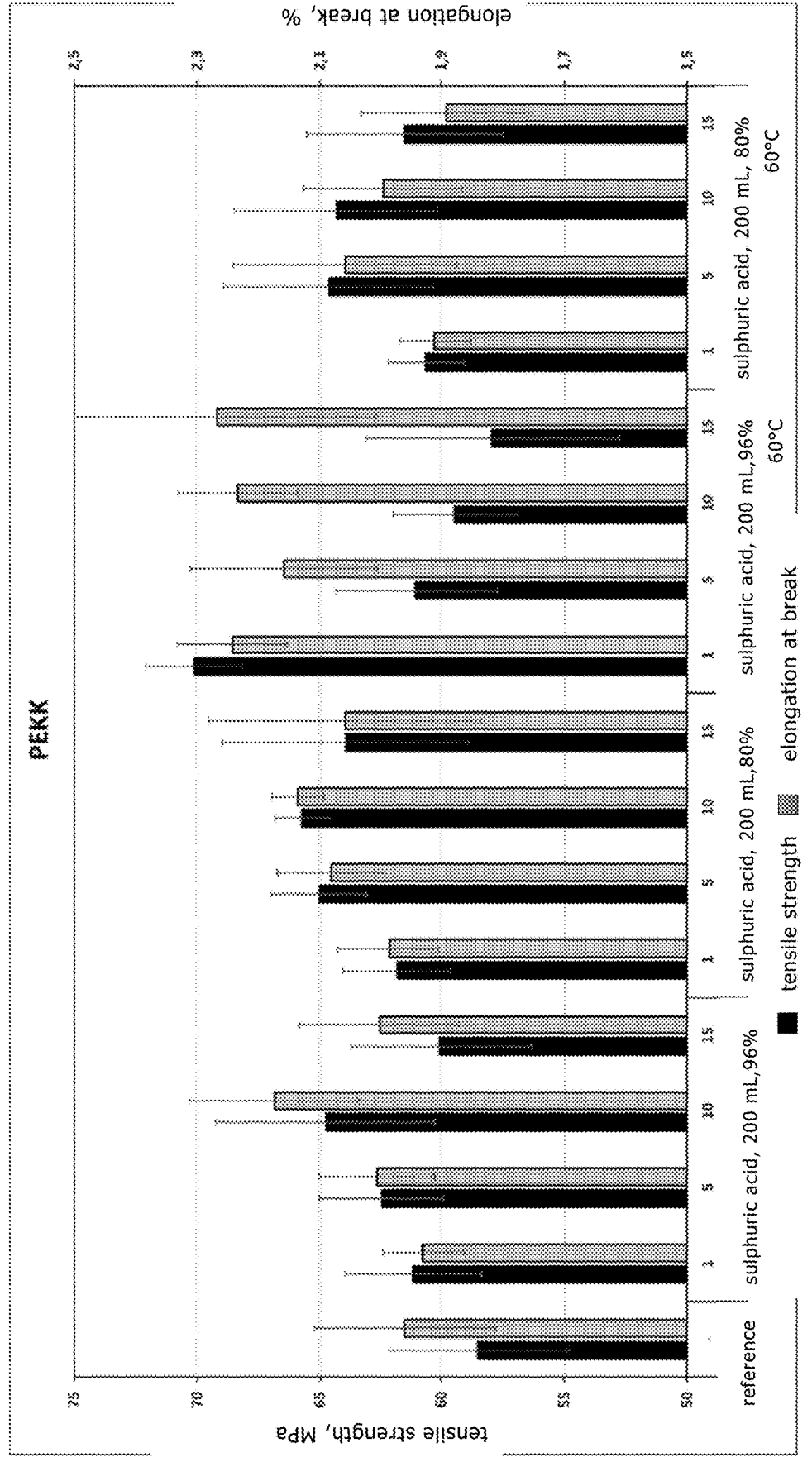

CHEMICAL TREATMENT OF COMPONENTS

TECHNICAL FIELD OF THE INVENTION

The present invention relates to methods for treating objects produced by an additive manufacturing process which have a surface formed from a polymer having a glass transition temperature of at least 120° C. or are formed from such a polymer, wherein in the context of the method the surface of the object is treated and contacted with an organic or inorganic solvent. The present invention further relates to three-dimensional objects produced according to such a method and the use of organic or inorganic solvents to reduce the surface roughness and/or the modulus of elasticity and/or to increase the tensile strength and/or the elongation at break of the object and/or to increase the chemical resistance.

BACKGROUND OF THE INVENTION

Objects produced by 3D printing have a comparatively rough surface compared to the corresponding objects produced by injection moulding, which is due to the manufacturing process. In injection moulding, the roughness of the object is determined by the roughness of the mould with which the object produced, so that it is easy here to produce very smooth and aesthetically pleasing surfaces. In contrast, objects produced by 3D printing are produced, for example, by spraying on successive layers or by selectively melting plastic powder in the powder bed in areas in which the later object will be produced. Although here the roughness can be influenced by the layer thickness of the individual layers, the visibility or at least haptic perceptibility of the layer structure cannot be completely avoided even by using small layer thicknesses, especially as this is limited by the minimum possible processing size of plastic powders or filaments. In addition, a compromise between quality and speed must also be found in 3D printing, which sets practical limits to the avoidance of layer structures.

These and other problems in 3D printing result in parts with a rough, jagged, "pixelated" surface that is sometimes even porous, which is often not visually or aesthetically pleasing. In addition, such surface finishes can be functionally limiting if smooth or impermeable surface properties are a required attribute of the 3D printed object. Small gaps and crevices on a surface of 3D-printed devices, for example, make it difficult or impossible to sterilise the surface, as bacteria can settle in the gaps and crevices. In addition, a pronounced layer structure has an unfavourable effect on the mechanical properties of the object orthogonal to the plane in which the layers extend, and the unevenness resulting from the roughness forms starting points for forces acting on the object, which can lead to damage or destruction of the object. Furthermore, due to the rough to porous surface structure an undesirable notch effect can result, which can have a negative impact on the maximum achievable strengths and elongations.

Various methods have already been described for smoothing the surface of 3D-printed objects, such as a mechanical treatment (e.g. grinding, polishing), chemical treatments (e.g. heated acetone vapour) or thermal treatments (e.g. localised IR or other heating) or the application of thicker coatings or paints. The effectiveness of such techniques is highly dependent on the required surface properties of the resulting surface in terms of time, cost, durability, etc. Such techniques may only serve to smooth the part, which may then require additional steps to enable controlled textures or surface features. In some embodiments, it may be desirable to preliminarily treat the surface before a film is applied in order to provide optimal cosmetic and functional properties.

In mechanical treatment material is removed from the surface of the object, which is not necessarily desirable from a material economical perspective. In addition, areas of the object may be difficult or impossible for an abrasive to reach, which entails restrictions in view of the shape of the correspondingly processable objects.

The chemical treatment, for example with acetone vapour, is described for objects made of comparatively soft plastics such as PLA or ABS. Here, the surface is softened or transformed into a fluid state with the help of the solution vapour to such an extent that a smoothed surface can be formed due to the surface forces at work. It is problematic here, however, that only a limited range of materials can be smoothed in this way, and that too long an exposure or too much solvent can lead to undesired "bleaching" of the surface or even to a damaging of the object.

The often times only low thermal conductivity of plastics poses a problem with the thermal treatment, which leads to the object heating up unevenly. This can be compensated for by very slow heating, but this is strongly at the expense of production time.

U.S. Pat. No. 9,908,291 B2 describes a method for providing a smoothed surface of a three-dimensional plastic object produced using a 3D printing process, in which a larger raw product layer is first produced and then a special filament material is applied during printing to the areas of the surface that are to be smoothed.

U.S. Pat. No. 10,759,116 B2 describes the application of a hardenable coating to a three-dimensional object initially produced by 3D printing, in which excess coating material is stripped off the object by rotating it before the coating is cured.

Against the background of the prior art described above, there is a need for a method by which the surface of an object with a plastic surface can be smoothed safely and easily. In particular, there is a need for a method with which plastic objects produced by 3D printing or additive manufacturing, which are based on high-temperature-resistant polymers, can be smoothed quickly, cheaply and safely, and at the same time the mechanical properties can be improved. The present invention addresses this need.

SUMMARY OF THE INVENTION

In the investigations on which the present invention is based, it was surprisingly found that plastic objects which are formed from a high-temperature-resistant polymer or at least have a surface formed from such a polymer can be smoothed by a treatment with an organic or inorganic solvent, wherein the surface is exposed to the solvent, for example by wetting or vapour deposition, and is removed from the object again after a short exposure time, for example by vaporisation or washing off. Compared to a grinding process, for example, the treatment with the solvent is associated with the advantage that the solvent can reach and act on all surface areas of the object, even in the case of objects with areas shielded by the surface. Compared to a thermal process, the advantage is realised that there is no need for slowly heating to a very high temperature, which is advantageous from an energy-economic point of view and due to possible damage to the object at high temperatures.

BRIEF DESCRIPTION OF THE DRAWING

FIG. 1 illustrates the development of the mechanical properties (tensile strength and elongation at break) for the various PEKK samples and the corresponding treatment conditions compared to the reference (untreated sample).

DETAILED DESCRIPTION OF THE EMBODIMENTS

According to a first aspect, the present invention thus relates to a method for treating a three-dimensional object produced by an additive manufacturing process, comprising bringing the object into contact with an organic or inorganic solvent, wherein at least the surface of the object is formed from a polymer having a glass transition temperature of at least 120° C.

The glass transition temperature of at least 120° C. entails that the object is an object with a high continuous service temperature. Below the glass transition temperature, the material is in a glass state in which it does not deform during use. Preferably, the polymer from which the object is formed has a glass transition temperature of at least 125° C. and/or at most 170° C. and particularly preferably of at least 130° C. and/or at most 160° C.

The polymer also preferably has a continuous service temperature, determined as heat distortion temperature according to ISO 75 HDT/A (1.8 MPa), of at least 140° C. and particularly preferably at least 150° C.

In the context of the invention described here, the "organic or inorganic solvent" is a medium which is liquid at ambient temperature (about 20° C.) and which can interact with the polymer, e.g. by dissolving the polymer, etching it (partial decomposition on the surface) or penetrating into the polymer in the sense of swelling and thus increasing the mobility of the polymer chains or promoting crystallisation of the polymer chains. If the object has a mixture of polymers on its surface, it is sufficient if the solvent interacts with one of these polymers in the specified form. Similarly, in the case of a block copolymer or a copolymer with an inhomogeneous distribution of the monomers, an interaction in the specified manner can take place with only one block of the block copolymer or the part of the copolymer that is more compatible with the solvent. In these cases, usually swelling of the polymer occurs.

In the context of the process described a three-dimensional object produced using an additive manufacturing process is to be treated. Such an object regularly has a noticeable surface roughness, for example a roughness of at least 20 μm and preferably at least 25 μm (determined as average roughness value according to DIN EN ISO 4287: 2010). In addition, a three-dimensional object produced using an additive manufacturing process can be distinguished from conventionally produced objects (e.g. by injection moulding) by the fact that it has a recognisable layer structure, at least when microscopically viewing of sections through the object, which results from the build-up of the object "layer-by-layer" in the additive manufacturing process.

On the other hand, the additive manufacturing process used to produce the object is not relevant to the method. Corresponding objects can be produced by, but are not limited to, selective laser sintering or selective laser melting, whereby a pulverulent starting material is provided as a powder bed and the locations in the layer that are to be included in the object can be heated and liquefied by exposure to electromagnetic radiation. The object is then built up as a result of the cooling of the material, in which further material is deposited layer-by-layer. The object can also be an object produced by fused deposition modelling (FDM), in which a filament is used as the starting material and in which molten filament is sprayed with the aid of a nozzle at the locations of the subsequent object.

In addition, the object can be produced by a method in which a plastic powder is used as starting material and solidified by applying an ink (as a "fusing agent") to the parts of the layer in which the object is later to be produced and solidifying it by subsequently irradiating the surface of the layer with a two-dimensional light source of a wavelength that is absorbed only by components of the ink. In this way, the plastic material "marked" with the ink is melted at selective points and can subsequently solidify into a three-dimensional object. Such a process is commercially marketed by the company HP as "Multi Jet Fusion". In a similarly acting process, also known as "binder jetting", a binder is applied to the parts of the layer of a plastic powder bed in which the object is later to be produced, and the object is produced by the binder solidifying.

Other methods by which the object can be produced include multi-jet modelling (wherein a liquid photosensitive plastic material is applied to a platform by a print head and cured by a radiation source which is integrated into the print head), film transfer imaging (by 3D-Systems), electrophotographic (EP) imaging and deposition (by Evolve Additive Solutions) or any other technology described for 3D printing.

All these processes have in common that objects with at least a microscopically detectable layer structure are obtained. The "three-dimensional object produced using an additive manufacturing process", which was produced using the method according to the invention, accordingly has such a structure.

In a preferred embodiment, the object brought into contact with the solvent in the context of the method according to the invention is formed entirely from the specified polymer, i.e. the object contains only polymer with a glass transition temperature of at least 120° C. as the polymer. However, other components, such as fillers, may be present in addition to the polymer.

As a result of bringing the object into contact with the organic or inorganic solvent, an interaction of the solvent with the polymer can take place in such a way that the polymer swells or is partially dissolved, while the inner area of the object remains in the plastically stable state and preferably at least partially in the glassy state ($T_{object} < Tg$). The surface of the object thus becomes deformable, whereby surface tension effects lead to a reduction in roughness and any pores present are closed. The smoothed surface created in this way also prevents or reduces hereafter the penetration of foreign substances into the object.

Depending on the exposure time, by the exposure of the solvent also an improved bonding of the layers in the object can be realised, which is reflected in improved mechanical properties compared to the object before treatment. Finally, the solvent can also cause microscopic layer changes or different arrangement of the polymer chains, which can, for example, promote higher crystallisation of the polymer. This can then macroscopically result in a higher strength and/or chemical resistance of the object.

In the method described here, the object is preferably brought into contact for a time period that is suitable for reducing the surface roughness $R_a$, determined as the average roughness value according to DIN EN ISO 4287:2010, by at least 5% and preferably at least 10% compared to the surface roughness of the object before the treatment. In this context, it is pointed out that the change in surface roughness is highly dependent on parameters such as the temperature, the polymer and the solvent with which the object is treated, making it difficult to provide meaningful time specifications. However, the skilled person is able to determine a suitable time period for a parameter set of temperature, polymer and solvent using a simple test series. As an example, in the context of a series of experiments, a reduction of more than 10% of the surface roughness of the object before treatment was achieved for an object made of PEKK by treatment with concentrated $H_2SO_4$ at 23° C. for less than 1 minute, by a treatment with THF at 23° C. for more than 30 minutes and by a treatment with N-Methylpyrrolidone at 23° C. for at least 5 minutes.

Alternatively or additionally to that, it is preferable if the bringing into contact is carried out for a time period that is sufficient to increase the tensile strength and/or the elongation at break, determined according to DIN ISO 527-1, by at least 5% and preferably at least 10% compared to the object before the treatment and/or to reduce the modulus of elasticity by at least 5% compared to the object before the treatment. Since in this case, too, dependencies of the time period on the underlying polymer, the solvent and the temperature result, a suitable time period for a particular set of these parameters can be determined by the skilled person using a simple test series.

In individual cases, treatment with the solvent can also result in an increase in the modulus of elasticity, for example, by the solvent treatment inducing higher crystallisation of the polymer. In such cases, it is preferred if the bringing into contact takes place for a time period that is sufficient to increase the modulus of elasticity, determined according to DIN ISO 527-1, by at least 2% and preferably at least 5% compared to the object before the treatment.

Despite the mentioned dependence, it is preferred if the time period for bringing into contact is at least 10 seconds and/or at most 240 minutes and preferably at least 30 seconds and/or at most 180 minutes. If a mineral acid is used as the solvent, the time period can be relatively short, e.g. 40 seconds to a maximum of 20 minutes and preferably at least 60 seconds and/or at most 15 minutes. If an organic aprotic solvent is used as the solvent, a longer treatment period is usually required to achieve the desired smoothing and/or to modify the tensile strength and/or the elongation at break and/or the modulus of elasticity, e.g. a time period of 3 to 180 minutes and preferably at least 5 minutes and/or at most 60 minutes.

The bringing into contact of the object with the solvent can be done at any temperature at which the solvent is present in liquid or gaseous form, whereby the temperature should not be above the melting temperature and preferably not above the glass transition temperature of the polymer in order to avoid deformations of the object (with the exception of the desired surface smoothing). A temperature range of 15° C. to 220° C., preferably at least 20° C. and/or at most 180° C., can be given as a suitable temperature window for the bringing into contact.

In a preferred embodiment, the bringing into contact takes place at ambient temperature (about 20° C.). In another preferred embodiment, the bringing into contact takes place at an elevated temperature, for example at a temperature in the range from 30° C. to 220° C. and preferably at least 60° C. and/or at most 180° C. Solvents with which temperatures of over 100° C. can be achieved are, for example, N-Methylpyrrolidone (boiling temperature 202° C.) and Dimethylacetamid (boiling temperature 165° C.). With these or other solvents, a treatment with liquid solvent at temperatures above the boiling point at normal pressure is also possible by carrying out the treatment at elevated pressure.

When treating objects at the mentioned temperatures, care must be taken to ensure that the treatment temperature does not exceed the glass transition temperature Tg of the polymer. It is preferred if the treatment temperature is at least 10° C. and particularly preferably at least 15° C. lower than the glass transition temperature Tg of the polymer. In the case of polymer blends or block copolymers that have several phases with different glass transition temperatures, the lowest glass transition temperature should be used to determine the treatment temperature.

The bringing into contact takes place at normal pressure (1013 hPa) or elevated pressure (>1013 hPa). If the bringing into contact is carried out at elevated pressure, the pressure should not exceed 250 bar and should preferably be at a maximum of 50 bar, and in particular a maximum of 5 bar. Preferably, the bringing into contact is done at normal pressure. Alternatively, the bringing into contact can also take place at a pressure below 1013 hPa, such as a pressure in the range from 100 to 800 hPa.

In a preferred embodiment, the bringing into contact takes place at ambient temperature by immersion at normal pressure or elevated pressure and preferably at normal pressure.

In another preferred embodiment, the bringing into contact is carried out at elevated temperature by immersion at normal pressure or elevated pressure, wherein the temperature is lower than the boiling point of the solvent and the melting temperature of the polymer. In this embodiment, the bringing into contact is preferably carried out at normal pressure.

In a still further preferred embodiment, the bringing into contact takes place at elevated temperature in the presence of vapour solvent at normal pressure or elevated pressure. For this embodiment, too, it is preferred, if the bringing into contact takes place at normal pressure. This embodiment can be created, for example, by vapour-depositing the object with the solvent, whereby the solvent can be thermally vaporised or vaporised or atomised under the influence of ultrasound.

The polymer from which the object and/or its surface is formed for the method of the invention is not subject to any relevant restrictions, with the exception of the specification of the glass transition temperature and the fact that it must be possible to process it into a three-dimensional object by an additive manufacturing process. However, polymers selected from the following group as well as mutually compatible mixtures of these polymers (i.e. mixtures which form a stable homogeneous or disperse phase) are particularly suitable in the context of the invention described here: Homo- or copolymers or polyblends comprising one or several selected from polysulfones (PSU), preferably polyarylene sulfones (PAS), polyarylethersulfones (PAES), polyethersulfones (PES), polyarylene sulfides, preferably polyphenylene sulfides (PPS), polyetherimides (PEI), polyimides (PI), polyamideimides (PAI), polyaryletherketones (PAEK), preferably polyetheretherketones (PEEK), polyetherketones (PEK), polyetherketoneketones (PEKK), polyetherketone-polyetherdiphenyletherketone (PEK-PEDEK), polyesters, polyethers or polycarbonates. A particularly preferred polymer is polyetheretherketone (PEEK) and polyetherimide (PEI), it is correspondingly preferred if the polymer of the three-dimensional object contains more than 50% by weight (based on the total amount of polymer) of PEKK or PEI and it is particularly preferred if the polymer of the three-dimensional object contains only PEKK or PEI as polymer.

In addition to the polymer, the three-dimensional object may also contain other components commonly contained in objects produced by additive manufacturing, such as flow agents, anti-agglomeration agents, reflective particles and/or pigments. A suitable type of reflective particles comprises, for example, $TiO_2$. A suitable flow agent and/or anti-agglomeration agent is, for example, carbon black or fumed silica. A particularly preferred type of additive that can be used to impart absorption properties at a wavelength at which the polymer materials do not absorb light are IR or NIR radiation absorbing materials, such as the carbon black types described in WO 2020/099236 A1. In addition, the three-dimensional object may contain typical stabilisers contained in technical polymers (e.g. antioxidants and UV stabilisers), chain growth limiters and/or other additives for controlling the polymerisation reaction (e.g. acidic buffer systems), functional additives (e.g. flame retardants) and/or intended or unintended impurities from polymerisation or pulverisation processes (e.g. catalysts, compatibilisers, processing aids).

In addition, the three-dimensional object may contain fillers, e.g. in the form of fibres (in particular carbon fibres), glass beads, which may optionally be hollow, or metal and in particular aluminium particles. Such fillers can be contained in the object, for example, in an amount of up to 60% by weight or in the range of 30% to 55% by weight. In this case, the content of the polymer in the three-dimensional object is preferably at least 85% by weight, more preferably at least 90% by weight and even more preferably at least 95% by weight of the proportion of materials not provided by fillers from which the object is formed.

The inorganic or organic solvent in the method according to the invention is also not subject to any relevant restrictions, with the exception of the specifications in the foregoing. In a preferred embodiment, the solvent is a dilute or concentrated mineral acid or a concentrated organic acid. Preferred mineral acids are, for example, sulphuric acid or nitric acid. Preferred organic acids are in particular acids with a pKs of 4.8 or less and preferably acids with a pKs of 2 or less. A suitable acid with a pKs of 4.8 or less is, for example, acetic acid. Suitable acids with a pKs of 2 or less are, for example, fluorinated carboxylic acids such as, in particular, trifluoroacetic acid or trifluoromethanesulfonic acid. Acids as solvents are particularly preferred in combination with acid-sensitive polymers such as polyethers, polyesters or polyamides.

In a particularly preferred embodiment, the solvent is sulphuric acid with a concentration of at least 70% and the polymer is or contains one of PEKK, PEK, PEEK or PEI.

In another preferred embodiment, as the solvent a concentrated or diluted lye, for example in the form of caustic soda solution or caustic potash solution is included in the method.

In a still further preferred embodiment, as solvent in the method according to the invention an aprotic organic solvent which suitably has a Hildebrand solubility parameter δ in the range from 18 to 24 is used. Particularly suitable solvents that fulfil this requirement are tetrahydrofuran (THF), dichloromethane, N-Methylpyrrolidone (NMP), dimethylacetamide (DMAc) or dibromomethane. A particularly preferred aprotic organic solvent is THF. Solvents with a Hildebrand solubility parameter δ of 18 to 24 are particularly advantageous in combination with polyether polymers such as PEK, PEKK or PEEK, which have a similar Hildebrand solubility parameter and thus a similar polarity as the solvent.

The method can be designed in a particularly advantageous way by treating the object in several stages with different solvents. Particularly preferred in this context is a treatment in a first stage, in which the surface of the object is smoothed with a concentrated or diluted mineral acid, and the treatment in a subsequent second stage, in which an organic solvent with a crystallising effect is used.

A crystallising effect of the organic solvent on the polymer of the object can usually be deduced from the modulus of elasticity, which increases as a result of a higher crystalline polymer content compared to the object before the treatment. Alternatively, a "crystallising effect" of a solvent on a polymer can be determined using DSC or WAXS, in which a higher crystallinity is shown by more pronounced melting transitions (peaks). Exemplary as solvents with a crystallising effect tetrahydrofuran, dichloromethane or dibromomethane are to be named, inter alia.

In order to remove unwanted residues of the solvent from the treated object after the bringing into contact, it is expedient to wash the three-dimensional object with water and possibly a water-miscible organic solvent with a boiling point of below 100° C. after the treatment with the organic or inorganic solvent. As suitable solvents for washing in particular lower alcohols ($C_1$-$C_6$), preferably ethanol, and lower ketones ($C_1$-$C_6$), in particular in the form of acetone, can be considered here. The object can then be dried. Depending on the solvent used in the treatment, residues of the same can, however, possibly also be removed by a treatment under reduced pressure/vacuum. By removing the solvent it is ensured that the solvent used cannot have a plasticising effect in the object, so that optimum mechanical properties are maintained. Additionally by this it is also prevented that the solvent is released during later use of the object, where it can lead to unpleasant odours.

In a further aspect, the present invention relates to a method for producing a three-dimensional object comprising i) the production of the three-dimensional object by selectively solidifying a pulverulent build-up material at the locations corresponding to the cross-section of the three-dimensional object in the respective layer by exposure to electromagnetic radiation, wherein a plastic powder is used as the build-up material, which is based on a polymer with a glass transition temperature of at least 120° C., or the production of the three-dimensional object from a filament as starting material, wherein molten filament of such a polymer is sprayed with the aid of a nozzle at the locations of the later object, and ii) the subsequent treatment of the object by bringing into contact the object with an organic or inorganic solvent. For preferred embodiments of step ii), reference is made to the above statements on preferred embodiments of the method according to the first aspect.

A method for the production of the three-dimensional object by selective solidification of a pulverulent build-up material which can be used in step i) is, for example, a method as known from DE 44 10 046. In such a method, a three-dimensional object is produced layer-by-layer—according to the principle of "additive manufacturing"—by applying layers of powder and bonding these layers to each other by selectively solidifying the powder at the locations corresponding to the cross-sections of the object. Other suitable methods for producing the three-dimensional object by selective solidification of a pulverulent build-up material are the methods described further above.

In a still further aspect, the present invention relates to a three-dimensional object produced by a method as described above. Such an object can be distinguished from conventionally produced objects by the inhomogeneous layer structure, which is still recognisable microscopically in a cross-section at a greater distance from the surface of the object, whereas it may no longer be perceptible on the surface of the object as a result of the exposure to the solvent.

Preferably, the object according to this aspect of the invention has a surface roughness $R_a$ according to DIN EN ISO 4287:2010 of less than less than 20 μm, preferably less than 15 μm, more preferably less than 10 μm, still more preferably less than 8 μm and still more preferably less than 5 μm. As the roughness of the surface is highly dependent on the manufacturing process, material properties, process parameters and component orientations, this value must be determined based on the usual parameters for objects that are manufactured using powder bed fusion (PBF) for Z-orientated (i.e. perpendicular to the construction plane) surfaces with the usual processing parameters (layer thicknesses, exposure parameters, etc.). Other additive manufacturing processes (e.g. material extrusion processes) as well as modified process parameters (in particular lower layer thicknesses, exposure parameters, etc.) can achieve significantly higher or lower roughness due to the process-specific particularities over the manufacturing process. Accordingly, the achievable roughness after treatment can also vary significantly. Nevertheless, mode of action and effect on the component properties is preferred according to this invention.

In a still further aspect, the present invention relates to the use of a treatment in which a three-dimensional object produced by an additive manufacturing process is contacted with an organic or inorganic solvent in order to reduce the surface roughness and/or the modulus of elasticity and/or to increase the tensile strength and/or the elongation at break of the object and/or to increase the chemical resistance, wherein the object preferably has a surface formed from a polymer with a glass transition temperature of at least 120° C., and particularly preferably is formed from such a polymer, optionally with the inclusion of further non-polymeric components. An improved chemical resistance can be determined, for example, in accordance with DIN EN ISO 175, whereby the change in mass, dimensions, expansion and surface changes is determined after the object has been stored in the chemical for a time period of 24 hours. Alternatively, a better chemical resistance correlates with a higher proportion of crystallinity in the polymer or at least in the polymer on the surface of the object, which can be determined using DSC or WAXS. The surface roughness and the mechanical properties are to be determined here in each case using the test methods specified above.

In connection with the above aspects, it should be noted that each preferred embodiment described above for one aspect is equally described as a preferred embodiment of the other aspects, even if the combination is not explicitly stated above for the sake of brevity. Furthermore, any combination of more or less preferred embodiments of an aspect, as well as any combination of more or less preferred embodiments of an aspect with any other aspect as described herein above, is considered to be described according to the invention.

In the context of the present invention, the terms "comprising" or "containing" and grammatical modifications thereof have the following meaning: In an embodiment, further elements may be included in addition to the elements mentioned. In another embodiment, essentially only the elements mentioned are included. In other words, the terms may be synonymous with the terms "consisting essentially of" or "consisting of" in addition to their conventional meaning in a particular embodiment.

In the following, the present invention is illustrated in more detail by means of some execution examples, which, however, are not to be understood in any way as limiting the scope of protection of the application.

Example 1

Standard test pieces (according to ASTM D638-14, Type I) in ZXY orientation made of carbon fibre reinforced PEKK (trade name ALM HT-23) produced by 3D printing with an EOS P810 laser sintering system were treated at room temperature with the solvents indicated in Table 1 for the time indicated in the table. Excess solvent was then removed, the test pieces were washed with water (and in the case of NMP and DMAc additionally with acetone) and the test pieces were dried in an air atmosphere for >12 h at room temperature.

The roughness (determined as the average roughness value $R_a$ according to DIN EN ISO 4287:2010), the modulus of elasticity, the tensile strength (UTS) and the elongation at break (each according to ASTM D638-14) were determined for the test pieces treated in this way. The results of these measurements are also shown in Table 1. Sample 1 is a comparative sample that was not subjected to solvent treatment.

TABLE 1

| Sample | treat-ment agent | treat-ment time [min] | roughness [μm] | modulus of elasticity [MPa] | UTS [MPa] | elongation at break [%] |
|---|---|---|---|---|---|---|
| 1 | — | — | 25.1 | 5820 | 63 | 1.12 |
| 2 | $H_2SO_4$ | 1 | 5.4 | 5740 | 70 | 1.32 |
| 3 | $H_2SO_4$ | 5 | 5.4 | 5480 | 72.5 | 1.48 |
| 4 | $H_2SO_4$ | 10 | 3.8 | 5460 | 74.6 | 1.53 |
| 5 | THF | 15 | 24.5 | 5900 | 60 | 1.1 |
| 6 | THF | 60 | 22.3 | 4950 | 65.5 | 1.42 |
| 7 | NMP | 5 | 22.3 | 5760 | 67 | 1.28 |
| 8 | NMP | 60 | 23.2 | 5660 | 64 | 1.18 |
| 9 | NMP | 180 | 22.9 | 5800 | 63.5 | 1.15 |
| 10 | DMac | 15 | 23.4 | 5500 | 66.5 | 1.30 |

As can be seen from Table 1, a treatment with concentrated sulphuric acid (H2SO4) can significantly reduce the roughness of the object. After the treatment, improved mechanical properties in the form of increased tensile strength and elongation at break and a reduced modulus of elasticity can also be observed. The samples treated with THF (=tetrahydrofuran) showed a smaller improvement in roughness and, with a longer treatment time (60 min), increased tensile strength and elongation at break. Similarly, the samples treated with NMP showed a slight improvement in roughness and an increase in elongation at break and tensile strength with a shorter treatment time.

Example 2

Tensile bars according to DIN EN ISO 527-2, type 1BA, made of polyetherketoneketone powder (PEKK, based on the Kepstan 6000 series from Arkema) or carbon fibre-filled PEKK powder (PEKK-CF, trade name: ALM HT-23) were produced by means of layer-by-layer, regioselective solidification on an EOS P810 laser sintering system in ZXY orientation. In addition, cuboidal test pieces were produced to determine the surface roughness, also in ZXY orientation.

The components were treated in concentrated sulphuric acid (96% or 80%) at room temperature (RT, ~23° C.) or at an elevated temperature (60° C.) for 1, 5, 10 and 15 minutes respectively at ambient pressure by immersing and constantly stirring the sulphuric acid. At the end of the treatment periods, the test pieces were washed in water and then stored in water for at least 12 hours in order to extract any remaining acid residues as far as possible. Subsequently, the test pieces were dried for at least 12 hours in a vacuum oven at 120° C., with dry nitrogen flowing through at an absolute pressure in the system of 220 to 280 mbar.

The tensile bars were tested in accordance with DIN EN ISO 527-1. Each measured value was determined as the average of five individual measurements.

The surface roughness $R_a$ was determined each time before and after the treatment at the corresponding test piece using a Keyence VR-3200 digital macroscope with measuring software version 2.5.0.236. For this purpose, a 3D model of the surface under consideration was is first created using various exposure settings, from which the average line roughness $R_a$ was calculated from several individual lines in Z-orientation.

The method used to determine $R_a$ is based on the ISO4287 and ISO4288 standard with filtering in accordance with ISO11562 with λc=2.5 mm and without λs (noise filtering) using a Keyence VR-3200 digital macroscope with measuring software version 2.5.0.236 in accordance with the manufacturer's specifications. In addition, it is referred to the Keyence VR-3000 user manual (April 2016), in particular chapters 11 and 12. For the determination, the end effect correction was activated, the double Gaussian filter was off, the number of measuring sections was 3 and the number of profiles 31. The respective images were taken with the micro camera 40× zoom and analysed with a suitable software.

The development of the mechanical properties (tensile strength and elongation at break) for the various PEKK samples and the corresponding treatment conditions compared to the reference (untreated sample) is exemplarily shown in FIG. 1.

In Table 2 and Table 3 the relative changes in the measured values due to the treatment are respectively given. The information is given as a unitless quotient of the measured value after treatment in relation to the measured value before the treatment (for the average line roughness $R_a$) or in relation to the untreated reference test pieces (for the tensile properties), rounded to two decimal places. Accordingly, a measured value less than 1 means a decrease, a measured value greater than 1 means the increase of the respective measured value due to the treatment. Deviations of 3-5% are within the range of the standard deviation.

TABLE 2

| Specific properties for PEKK after treatment (relative values) | | | | | | |
|---|---|---|---|---|---|---|
| solvent | temperature | duration [min] | modulus of elasticity | tensile strength | elongation at break | roughness |
| H₂SO₄, 96% | RT | 1 | 1.06 | 1.04 | 0.99 | 0.46 |
| | | 5 | 1.03 | 1.07 | 1.06 | 0.41 |
| | | 10 | 1.02 | 1.11 | 1.11 | 0.60 |
| | | 15 | 0.99 | 1.03 | 1.02 | 0.46 |
| | 60° C. | 1 | 1.06 | 1.20 | 1.14 | 0.36 |
| | | 5 | 0.95 | 1.04 | 1.10 | 0.63 |
| | | 10 | 0.90 | 1.02 | 1.14 | 0.85 |
| | | 15 | 0.87 | 0.99 | 1.16 | |
| H₂SO₄, 80% | RT | 1 | 1.04 | 1.06 | 1.02 | 0.79 |
| | | 5 | 1.06 | 1.11 | 1.06 | 0.36 |
| | | 10 | 1.04 | 1.12 | 1.09 | 0.37 |
| | | 15 | 1.04 | 1.09 | 1.05 | 0.54 |
| | 60° C. | 1 | 1.04 | 1.04 | 0.97 | 0.50 |
| | | 5 | 1.06 | 1.10 | 1.05 | 0.40 |
| | | 10 | 1.08 | 1.10 | 1.02 | 0.27 |
| | | 15 | 1.06 | 1.05 | 0.96 | 0.30 |

TABLE 3

| Results PEKK-CF after treatment (relative values) | | | | | | |
|---|---|---|---|---|---|---|
| solvent | temperature | duration [min] | modulus of elasticity | tensile strength | elongation at break | roughness |
| H₂SO₄, 96% | RT | 1 | 1.00 | 1.04 | 1.05 | 0.45 |
| | | 5 | 0.99 | 1.06 | 1.09 | 0.35 |
| | | 10 | 0.95 | 1.01 | 1.09 | 0.32 |
| | | 15 | 0.94 | 1.00 | 1.09 | 0.40 |
| H₂SO₄, 80% | RT | 1 | 0.98 | 1.02 | 1.03 | 0.96 |
| | | 5 | 1.00 | 0.98 | 1.00 | 0.81 |
| | | 10 | 1.00 | 0.99 | 1.05 | 0.97 |
| | | 15 | 0.99 | 0.97 | 1.00 | 1.08 |

The results in Tables 2 and 3 show a clear smoothing effect for concentrated sulphuric acid (96%), which is also accompanied by an improvement in the mechanical properties, in particular an increase in elongation at break by about 10%. Since this effect is essentially independent of a change in the tensile modulus, it is assumed that the effect is due to the reduced notch effect caused by the smoothing.

At elevated temperatures, a change in the tensile modulus can also be observed for PEKK, which points to an effect of the solvent also inside the component.

The advantageous effects are also still visible for sulphuric acid diluted to 80%, but in some cases require a longer exposure time.

Example 3

Tensile bars according to DIN EN ISO 527-2, type 1BA, made of polyetherimide powder (PEI, based on the Ultem 5000 series from Sabic) were manufactured using layer-by-layer, regioselective solidification on a modified EOS P810 laser sintering system in XYZ orientation. Each time one test piece was immersed in a respective solvent (purity >99%) according to Table 4 for 180 minutes at room temperature and ambient pressure. The test pieces were subsequently washed with ethanol and immersed in ethanol for at least 12 hours in order to extract solvent residues from the components as far as possible. Subsequently, the test pieces were dried for at least 12 hours in a vacuum oven at 120° C., with dry nitrogen flowing through at an absolute pressure in the system of 220 to 280 mbar.

The individual tension bars were subjected to a tensile test in accordance with DIN EN ISO 527-1. In addition, a set of five untreated tension bars was tested as reference.

After completed tensile test, the components were subjected to thermal differential calorimetry in accordance with DIN EN ISO 11357. For this purpose, a sample of approximately 5 mg each was taken from the component and evaluated with a measuring system (DSC 823e, Mettler Toledo, evaluation via "STARe Software", version 16.30) under nitrogen 5.0 (purity >99.999% nitrogen). For this purpose, the respective sample was first conditioned for 5 minutes at 0° C. and then heated to 400° C. at a constant heating rate of 20K/min. After conditioning at 400° C. for 5 minutes, the sample was cooled to 0° C. at a cooling rate of 20K/min and then, after 5 minutes of conditioning at this temperature, heated again to 400° C. at a constant heating rate of 20K/min. The glass transition temperature Tg, the melting point Tm and the specific enthalpy of fusion ΔHm were determined from DSC measurements for different samples in accordance with DIN EN ISO 11357. In Table 4 the corresponding the values determined for the first heating run are given. Thereby, the glass transition Tg corresponds to the centre of the step according to standard, the melting temperature Tm corresponds to the peak maximum of the melting peak, and the enthalpy of fusion ΔHm describes the integral of the peak normalised to the sample mass.

TABLE 4

| solvent | Tg [° C.] | Tm [° C.] | ΔHm [J/g] | comment |
|---|---|---|---|---|
| reference | 224 | — | — | component translucent |
| N,N'-dimethylacetamide | 224 | — | — | no optical change |
| tetrahydrofuran | 225 | 295 | 1.5 | no optical change |
| dibromomethane | 223 | 282 | 8 | component opaque, partial cracking on the surface |
| dichloromethane | 223 | 281 | 17 | component opaque, partial cracking on the surface |

The results show that suitable solvents can induce a crystallisation, whereas the component produced from the manufacturing process (reference) is amorphous. However, the result and the effects are strongly dependent on the solvent. Due to the increased crystallinity, a higher mechanical strength (e.g. in the form of an increased tensile modulus) can be expected. In addition, by the increased crystallinity (increased enthalpy of fusion) a better resistance to the exposure to chemicals is to be expected.

By optimising the treatment conditions (e.g. solvent, type and duration of exposure), an optimization of the desired properties is also to be expected, for example, an improved chemical resistance can be achieved by a crystallisation of the surface layer limited in its depth and a smoother surface (through partial dissolving or swelling), while a reduction in elongation at break is avoided.

The invention claimed is:

1. A method for treating a three-dimensional object produced by an additive manufacturing process, comprising:
   bringing the object into contact with an organic or inorganic solvent, wherein at least a surface of the object is formed from a polymer that has a glass transition temperature of at least 120° C.,
   wherein the bringing the object into contact is carried out in a plurality of stages, wherein each stage uses a different solvent as the organic or inorganic solvent.

2. The method according to claim 1, wherein the bringing the object into contact takes place for a time period which is sufficient to reduce a surface roughness, determined as an average roughness value to DIN EN ISO 4287:2010, by at least 10% compared to the surface roughness of the object before the bringing the object into contact.

3. The method according to claim 1, wherein the bringing the object into contact takes place for a time period which is sufficient to increase a tensile strength and/or an elongation at break of the object, determined according to DIN ISO 527-1, by at least 10% compared to the object before the bringing the object into contact and/or to reduce a modulus of elasticity of the object by at least 5% compared to the object before the bringing the object into contact.

4. The method according to claim 1, wherein the bringing the object into contact takes place by immersing the object in the organic or inorganic solvent or by bringing the object into contact with the organic or inorganic solvent by vapor deposition.

5. The method according to claim 1, wherein the bringing the object into contact takes place at a temperature in a range from 60° C. to 180° C.

6. The method according to claim 1, wherein the polymer is selected from homo- or copolymers or polyblends comprising at least one member from the group consisting of polysulfones, polyarylene sulfones, polyarylethersulfones, polyethersulfones, polyarylene sulfides, polyphenylene sulphides, polyetherimides, polyimides, polyamideimides, polyaryletherketones, polyetheretherketones, polyetherketones, polyetherketoneketones, polyetherketone-polyetherdiphenyletherketone, polyesters, polyethers, and polycarbonates.

7. The method according to claim 1, wherein the organic or inorganic solvent is selected from at least one member from the group consisting of concentrated and/or dilute mineral acids in a form of sulphuric acid or nitric acid, concentrated organic acids, and aprotic organic solvents with a Hildebrand solubility parameter in a range from 18 to 24 selected from the group consisting of tetrahydrofuran, dichloromethane, N-Methylpyrrolidone, and dimethylacetamide.

8. The method according to claim 1, wherein the bringing the object into contact is carried out by applying a concentrated or diluted mineral acid in a first stage and treatment with an organic solvent having a crystallizing effect in a subsequent second stage.

9. The method according to claim 1, wherein the three-dimensional object, after treatment with the organic or inorganic solvent, is washed with water and then dried.

10. The method according to claim 1, wherein the bringing the object into contact takes place for a time period which is sufficient to reduce a surface roughness, determined as an average roughness value to DIN EN ISO 4287:2010, by at least 5% compared to the surface roughness of the object before the bringing the object into contact.

11. The method according to claim 1, wherein the bringing the object into contact takes place for a time period which is sufficient to increase a tensile strength and/or an elongation at break, determined according to DIN ISO 527-1, by at least 5% compared to the object before the bringing the object into contact and/or to reduce a modulus of elasticity by at least 5% compared to the object before the bringing the object into contact.

12. The method according to claim 1, wherein the bringing the object into contact takes place at a temperature in a range from 15° C. to 220° C.

13. The method according to claim 1, wherein the organic or inorganic solvent is selected from at least one of concentrated and/or dilute mineral acids.

* * * * *